June 18, 1968 W. M. FOLEY 3,388,596
AIRBORNE HUMIDITY GRADIENT SENSOR
Filed June 30, 1967
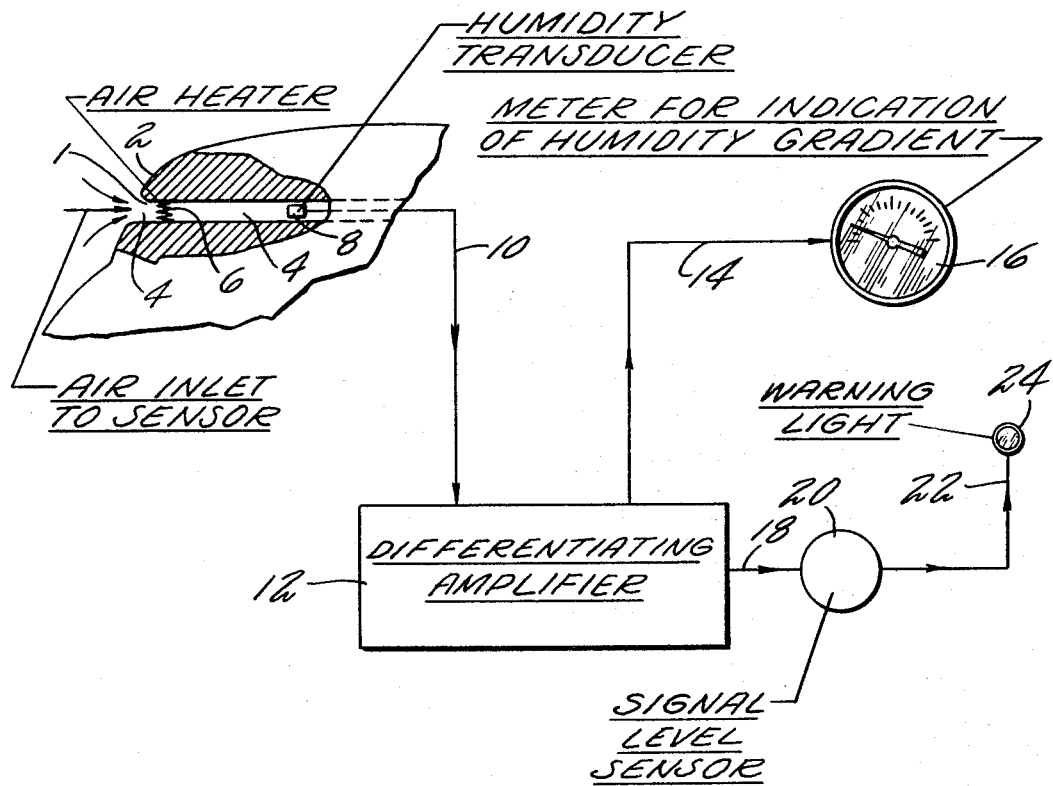
INVENTOR.
WILLIAM M. FOLEY
BY
*Melvin Pearson Williams*
ATTORNEY 3,388,596
AIRBORNE HUMIDITY GRADIENT SENSOR
William M. Foley, Glastonbury, Conn., assignor to United Aircraft Corporation, East Hartford, Conn., a corporation of Delaware
Filed June 30, 1967, Ser. No. 650,532
3 Claims. (Cl. 73—336.5)

ABSTRACT OF THE DISCLOSURE

A heater provides a uniform temperature to air injected at an inlet on an aircraft, and a humidity transducer provides a signal indicating the vapor content of the air, the humidity signal being monitored on a meter and capable of providing a warning when exceeding a given level.

Background of the invention

*Field of invention.*—This invention relates to humidity sensing, and more particularly to a humidity gradient sensor for use on aircraft to intiate the onset of possible clear air turbulence.

*Description of the prior art.*—The existence of clear air turbulence poses a particularly difficult problem in aviation, since it is sufficiently intense on some occasions to result in discomfort and possible injury to flight crews and passengers and may even cause damage to the aircraft. However, no adequate techniques exist for detecting areas of clear air turbulence before the effects of the turbulence are encountered. Clear air turbulence is normally associated with frontal systems which are characterized by air masses of different characteristics on opposite sides of the front. From visual observations, it is evident that discontinuities in moisture content exist at these fronts. For example, hazy air characteriizes the jet stream region on the warm side of a polar front, while the polar air itself is often crystal clear. The tropopause, where clear air turbulence is common, frequency appears as a well-defined top of a haze layer. Humidity translucers can be used to determine the vapor content in the airstream with accuracy as great as one part per million. At the flight altitudes where clear air turbulence is encountered, an increase or decrease in monsture content between 10 and 1,000 parts per million may be anticipated when flying across a frontal system. Additionally, there is some evidence that "fingers" of moisture reach out from such discontinuity as a result of turbulence, so that the use of humidity gradient sensing may be utilized to provide advance warning that clear air turbulence will be encountered. Furthermore, additional knowledge of the moisture gradients attending clear air turbulence will enhance the general study relating to the mitigation of the effect thereof in air travel.

Summary of invention

An object of the present invention is to provide an improved airborne humidity gradient detecting system.

According to the present invention, air received at an inlet of an aircraft is heated to a uniform temperature and a humidity transducer disposed in the stream of uniformly heated air provides electrical signals which may be utilized to present an indication of humidity gradient, and to operate alarm means in response to gradients greater than a predetermined value.

The foregoing and other objects, features and advantages of the present invention will become more apparent in the light of the following detailed description of preferred embodiments thereof as illustrated in the accompanying drawing.

Brief description of the drawing

The sole figure herein comprises a partially illustrative, semi-schematic diagram of one embodiment of the present invention.

Description of the preferred embodiment

Referring now to the figure, an air inlet 1 may be provided in a suitable cowl 2 which could be mounted on the cabin, a wing tip, or an engine nacelle of an aircraft. The inlet communicates with duct work 4 within which is disposed a heater 6 which may be electric or of another suitble type. Downstream of the heater 6 is a humidity transducer 8 which may be any one of several well-known types, a number of which are available on the market. The humidity transducer will provide an electric potential as a function of the relative humidity of the air passing through the duct 4. The electric potential may be connected by suitable cabling 10 to a differentiating amplifier 12 where the derivative of the humidity-indicating potential is taken, and suitable amplification and shaping of the signal will take place. The circuitry of the differentiating amplifier 12 may be any one of a number of well-known configurations. Its essential characteristics are to be able to recognize the range of potentials applied by the cabling 10, take the derivative with respect to time of the potentials, and provide suitable corresponding signals to operate the monitoring equipment associated therewith. The output of the differentiating amplifier 12 may be applied through suitable cabling 14 to a meter 16 adapted to indicate humidity gradients as a result of signals supplied by the differentiating amplifier 12. Another output of the differentiating amplifier 12 may be connected through suitable cabling 18 to a signal-level sensor 20 which in turn is connected (22) to a warning light 24, or buzzer or other suitable alarm.

In operation, as a result of forward motion of the aircraft, air enters the inlet 1 and is transported along the duct where it is heated to a uniform temperature by the heater 6. Since the temperature is known, the transducer 8 will provide a relatively accurate indication of the humidity content of the air in the duct 4. Differentiating the signal resulting from the humidity transducer 8 will give the rate of change of humidity with respect to time, thereby indicating the humidity gradient along the path of the aircraft. This humidity gradient may be monitored continuously by observation of the meter 16, and may also be monitored to determine when the gradient exceeds a predetermined amount so as to cause a suitable alarm indication such as by the warning light 24.

Although the invention has been shown and described with respect to a preferred embodiment thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which I claim as new and desire to secure by Letters Patent of the United States is:

1. An airborne humidity gradient sensor adapted for use in conjunction with an air inlet and duct means mounted on the aircraft, said gradient sensor comprising:
   a heater adapted to be disposed within an airflow path in the duct means mounted on said aircraft;
   a humidity transducer adapted to be disposed downstream from said heater in the duct means of said aircraft;
   signal differentiating means responsive to said humidity transducer;
   and monitoring means responsive to said signal differentiating means for providing an indication of the rate of change of humidity sensed by said transducer.

2. The airborne humidity gradient sensor according to claim 1 wherein said monitoring means comprises a signal-level sensor for determining a humidity gradient in excess of a predetermined value and further comprises alarm means responsive to said signal-level sensor for providing an indication of a humidity gradient in excess of determined level.

3. The airborne humidity gradient sensor according to claim 1 wherein said monitoring means comprises a continuously operable visible meter for indicating instantaneous humidity gradients detected by said differentiating means.

References Cited
UNITED STATES PATENTS 2,915,898   12/1959   Van Luik _____ 73—29

DAVID SCHONBERG, *Primary Examiner.*

DENIS E. CORR, *Assistant Examiner.*